United States Patent
Ishikawa et al.

[11] Patent Number: 5,620,071
[45] Date of Patent: Apr. 15, 1997

[54] ELECTRICALLY CONTROLLED FORCE TRANSMITTING METHOD AND ELECTRICALLY CONTROLLED FORCE TRANSMITTING APPARATUS

[75] Inventors: Masazumi Ishikawa, Yokosuka; Katsunori Aoki, Tokyo; Yasuhiko Ohsawa, Yokosuka; Junichi Takimoto, Yonezawa; Keishi Negita, Yokohama; Hiroshi Takao, Kamakura, all of Japan

[73] Assignee: Nissan Motor Co., Ltd., Yokohama, Japan

[21] Appl. No.: 401,500

[22] Filed: Mar. 10, 1995

[30] Foreign Application Priority Data

Mar. 11, 1994 [JP] Japan .................................. 6-041126

[51] Int. Cl.$^6$ .................................................. F16D 28/00
[52] U.S. Cl. .................................................. 192/21.5
[58] Field of Search .............................. 192/21.5, 84 E; 361/234; 310/308

[56] References Cited

U.S. PATENT DOCUMENTS

| | | | |
|---|---|---|---|
| 2,417,850 | 3/1947 | Winslow . | |
| 2,886,151 | 5/1959 | Winslow | 192/21.5 |
| 2,897,425 | 7/1959 | Waring | 192/21.5 X |
| 2,903,109 | 9/1959 | Didszuns | 192/21.5 |
| 2,955,692 | 10/1960 | Thomas | 192/21.5 X |
| 2,958,790 | 11/1960 | Bahnson | 310/308 |
| 3,047,507 | 7/1962 | Winslow | 192/21.5 X |
| 3,255,853 | 6/1966 | Klass et al. | 192/21.5 |
| 3,390,313 | 6/1968 | Peck | 192/21.5 X |
| 4,444,298 | 4/1984 | Stangroom | 192/21.5 |
| 4,849,120 | 7/1989 | Price et al. | 192/21.5 X |

FOREIGN PATENT DOCUMENTS

| | | |
|---|---|---|
| 4-63752 | 2/1992 | Japan . |
| 57-120730 | 7/1992 | Japan . |

Primary Examiner—Rodney H. Bonck
Attorney, Agent, or Firm—Lowe, Price, LeBlanc & Becker

[57] ABSTRACT

The electrically controlled force transmitting apparatus includes a drive member having an electrically conductive surface and a driven member having an electrically conductive surface, which are arranged to be opposed to each other with a small space therebetween, a fibrous member provided in the space between the opposed electrically conductive surfaces of the drive and driven members, and a voltage supply source connected across the electrically conductive surfaces, whereby by applying a voltage across the opposed surfaces, there is induced a shear stress and a force is transmitted from the drive member to the driven member. The space in which the fibrous member is arranged is preferably filled with an electrically insulating fluid medium.

20 Claims, 6 Drawing Sheets

FIG_1

FIG_2

FIG_3

FIG_4

FIG_5

FIG_6A

FIG_6B

FIG_6C

FIG_7

FIG_8

ELECTRICALLY CONTROLLED FORCE TRANSMITTING METHOD AND ELECTRICALLY CONTROLLED FORCE TRANSMITTING APPARATUS

BACKGROUND OF THE INVENTION

The present invention relates to an electrically controlled force transmitting method and an electrically controlled force transmitting apparatus, wherein transmission of force or transmission of motion such as rotational motion, reciprocal motion, translational motion, etc. is easily controlled by means of an electrical signal. More particularly, this invention relates to a novel method and apparatus for electric control of force transmission, which are applicable to clutches, brakes, shock absorbers, dampers, actuators, and the like.

Various electrically controlled force transmission methods and apparatuses have been proposed. In one known method, use is made of an electro-viscous fluid whose viscosity can be controlled electrically. When a voltage is applied to the electro-viscous fluid, the viscosity of the fluid is increased, thereby a shear stress is induced and a force is transmitted from a drive member to a driven member. Due to this property, the electro-viscous fluid has been utilized in electrically controlled clutches, brakes, shock absorbers, dampers, actuators, and the like. For example, electrically controlled clutches using the electro-viscous fluid have been disclosed in U.S. Pat. No. 2,417,850 and Japanese Patent Application Laid-Open Kokai Sho 57-120,730. A braking apparatus using an electro-viscous fluid has been also disclosed in Japanese Patent Application Laid-Open Kokai Hei 4-63,752.

The electro-viscous fluids, however, have such disadvantages that (1) induced shear stress, which is generated when a voltage is applied, is rather small; (2) a current density during the voltage application is rather high; (3) particles dispersed in the fluids are subject to aggregation and sedimentation due to the gravitational force; and (4) the dispersed particles might cause undesired wear of sealing members such as O-rings in the apparatus which are in contact with the electro-viscous fluid.

SUMMARY OF THE INVENTION

Accordingly, a primary object of the present invention is to solve the above mentioned problems involved in the conventional, electrically controlled force transmitting apparatuses and methods due to usage of the electro-viscous fluids, and to provide a method and apparatus for electrically controlling a force transmission, which are free from the aggregation and sedimentation of dispersed particles as well as the wear of apparatus components caused by the particles, and wherein a large shear stress is induced by the application of a voltage while reducing the current density, and the force transmission property can be easily controlled merely by adjusting the application of voltage.

The above-mentioned object is accomplished by means of the present invention which provides an electrically controlled force transmitting method comprising the steps of:

arranging a driven member having an electrically conductive surface and a driven member having an electrically conductive surface such that said electrically conductive surfaces are opposed to each other with a small space;

providing a fibrous member in said space formed between said opposed electrically conductive surfaces of the drive and driven members; and adjusting a voltage applied across said opposed electrically conductive surfaces of the drive and driven members.

It should be noted that according to the invention, the step of adjusting the voltage includes an application of a voltage of zero volt, a voltage is not applied across the opposed surfaces.

In a preferable embodiment of the method according to the present invention, the space between the opposed surfaces of the drive and driven members in which the fibrous member is provided is filled with an electrically insulating medium such as gaseous body, liquid or the like. Particularly, a silicone oil may be advantageously used for this purpose.

The present invention also provides an electrically controlled force transmitting apparatus which comprises:

a drive member having an electrically conductive surface;

a driven member having an electrically conductive surface, which is arranged to be opposed to said electrically conductive surface of the drive member, while a space is formed between the opposed electrically conductive surfaces of the drive and driven members;

a fibrous member provided within said space between the opposed electrically conductive surfaces of the drive and driven members; and a voltage applying means connected across the opposed electrically conductive surfaces of the drive and driven members; wherein transmission of force from the drive member to the driven member is electrically controlled by adjusting a voltage applied across the opposed electrically conductive surfaces of the drive and driven members.

In a preferable embodiment of the force transmission apparatus according to the present invention, the space between the opposed surfaces of the drive and driven members in which the fibrous member is provided is filled with an electrically insulating medium such as gaseous body, liquid or the like.

In the electrically controlled force transmitting apparatus of the present invention, the fibrous member may be constituted by fibers or fiber assemblies fixed to each of the opposed electrically conductive surfaces of the drive and driven members, and may be constituted by fibers or a fiber assembly fixed to either of the opposed surfaces. There also is a case where the fibrous member is constituted by fibers or a fiber assembly provided between the opposed surfaces without being fixed to either of them.

The drive member and driven member in the electrically controlled force transmitting apparatus of the present invention can be constituted such that a rotational motion and/or translational motion can be transmitted from the drive member to the driven member. The opposed surfaces of the drive and driven members may be of circular shape, of cylindrical shape, of conical shape, of rectangular shape or the like.

At least one natural or synthetic fiber may be used as a material for constituting the fibrous member used in the present invention. The fibrous member in the present invention may be in a form selected from the group consisting of thread, woven fabric, knitted fabric, non-woven fabric, felt, flock fabric, leather and paper. The fibrous member may have a composite form obtained by combining two or more constituents selected from the above group.

The electrically controlled force transmitting method and apparatus according to the present invention include a fibrous member interposed between opposed electrically conductive surfaces of a drive member and a driven member.

This fibrous member can be arranged between the opposed surfaces by any appropriate method. For instance, the fibrous member may be constituted by fibers or fiber assemblies fixed to each of the opposed surfaces, or it may be constituted by fibers or a fiber assembly fixed to either of the opposed surfaces. Alternatively, the fibrous member is constituted by fibers or a fiber assembly provided in the space between the opposed surfaces without being fixed to either of them. In any case, a DC voltage, an AC voltage having a suitable frequency or a DC voltage having an AC voltage superimposed thereon may be applied across the opposed surfaces. It has been experimentally confirmed that the dependency of the force transmission on the kind of voltage is not changed in regardless of the manner of arranging the fibers or a fiber assembly between the opposed surfaces. In embodiments explained hereinafter a DC voltage is applied across the opposed surfaces. This is due to the fact that fibrous members used in the embodiments can yield superior force transmission by applying DC voltage across the opposed surfaces. In other words, it has been confirmed that there is no relation between the kind of the applied voltage and the manner of arranging the fibrous member between the opposed surfaces. Therefore, the kind of the applied voltage may be determined in accordance with a kind of the fibrous members.

When the fibrous member is constituted by fibers or fiber assemblies fixed to each of the opposed surfaces, first fibers or fiber assembly secured to one of the opposed surfaces and second fibers or fiber assembly secured to the other surface are arranged such that in an idle state, they come into loose contact with each other, or they can come into contact with each other with an appropriate overlap. Accordingly, upon the application of a voltage, the opposed fibers or fiber assemblies are intertwined more strongly, thereby inducing shear stress by which a torque of rotational movement, displacement of reciprocal movement or the like of the drive member is effectively transmitted to the driven member.

In this connection, the phenomenon in which shear stress is induced upon application of voltage is the same, in appearance, as the phenomenon which takes place in electro-viscous fluids. In the case of electro-viscous fluids, however, the shear stress is considered to be induced due to increase in viscosity which is caused by formation of clusters among the dispersed particles. On the other hand, in the present invention, it is considered that the shear stress is induced due to the attraction (or repulsion) between the fibers fixed to each of the opposed surfaces of the drive and driven members.

In the case where the fibrous member is constituted by fibers or a fiber assembly fixed to either one of the opposed surfaces of the drive and driven members, it is considered that shear stress is induced due to increase in friction between the fibers or fiber assembly secured to one surface and the other bare surface caused by the application of voltage, thereby enabling the fibrous member to transmit motive power (torque) or displacement of the drive member to the driven member.

In the case where the fibrous member is constituted by fibers or a fiber assembly provided between the opposed surfaces of the drive and driven member without being fixed to either of them, shear stress induced upon the application of voltage is increased due to increase in friction between the fibrous member and the opposed surfaces of the drive and driven members.

In comparison with the known apparatuses utilizing electro-viscous fluids, the force transmitting apparatus according to the present invention does not include particles dispersed in a medium, and therefore it is free from aggregation and sedimentation of particles as well as wear of apparatus components caused by the particles. In addition, the induced shear stress is large and the density of a current flowing between the opposed surfaces during the application of voltage is low when compared with those in the case of the known apparatuses using the electro-viscous fluids.

DETAILED DESCRIPTION OF PREFERRED EMBODIMENTS

The present invention will be described in detail with reference to preferred embodiments illustrated in the attached drawings.

Figure 1:
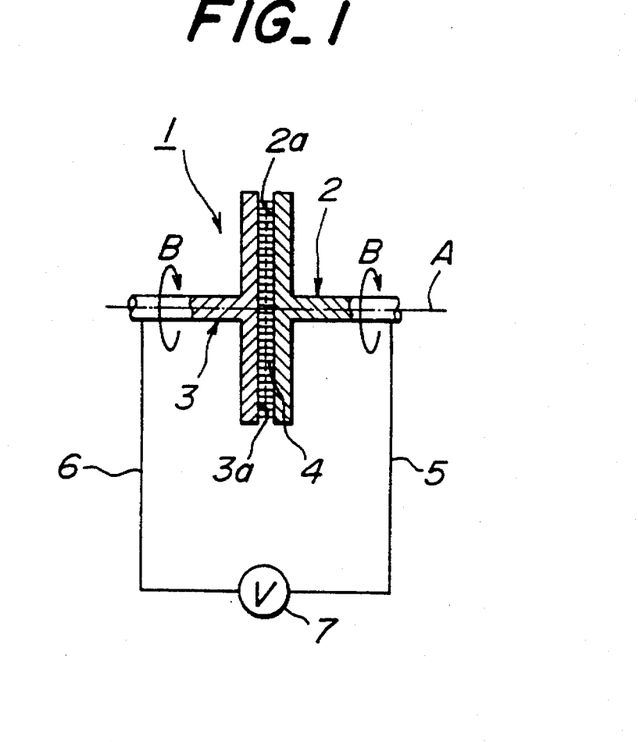
FIG. 1 is a cross-sectional view illustrating a first embodiment of the electrically controlled force transmitting apparatus according to the present invention.

FIG. 1 shows a first embodiment of the electrically controlled force transmitting apparatus according to the present invention. An electrically controlled force transmitting apparatus 1 comprises a drive member 2 and driven member 3 including circular disk-like members which are arranged rotatably about shafts extending through centers of the disk-like members in directions shown by arrows A and B, respectively or in the reverse directions. According to the invention, at least surfaces of the disk-like members have to be made of an electrically conductive material. In the present embodiment, the disk-like members and shafts are made of an electrically conductive material. The disk-like members have opposed surfaces 2a and 3a arranged in parallel with each other with a small space therebetween. In this embodiment, a fibrous member 4 is formed by two fiber assemblies which are fixed to each of the opposed surfaces 2a and 3a. In this manner, the fibrous member 4 is arranged between the drive member 2 and driven member 3. Further, a voltage applying means 7 is connected across the opposed surfaces 2a and 3a via conductors 5 and 6.

Figure 2:
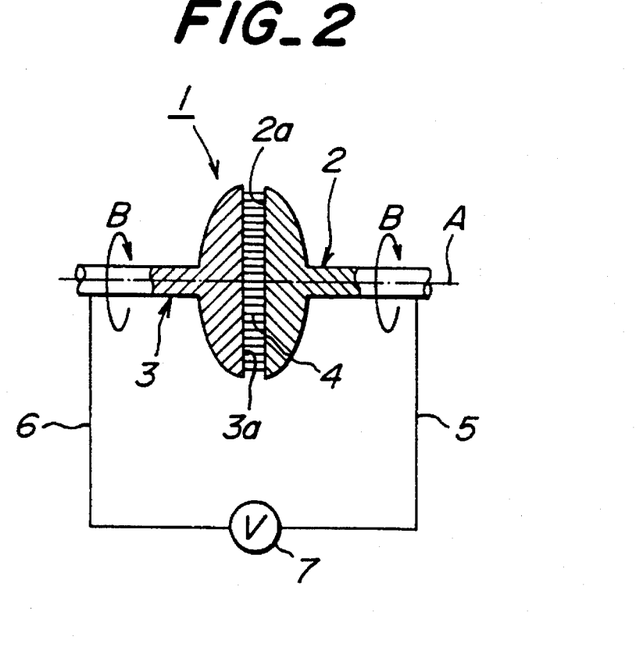
FIG. 2 is a cross-sectional view illustrating a second embodiment of the electrically controlled force transmitting apparatus according to the present invention.

Referring to FIG. 2, there is shown a second embodiment of the electrically controlled force transmitting apparatus according to the present invention. In this embodiment, the electrically controlled force transmitting apparatus 1 has substantially the same construction and arrangement as that of the first embodiment except for the fibrous member 4. The fibrous member 4 of this embodiment is constituted by a single fiber assembly which is fixed to the circular surface 2a of the drive member 2.

Figure 3:
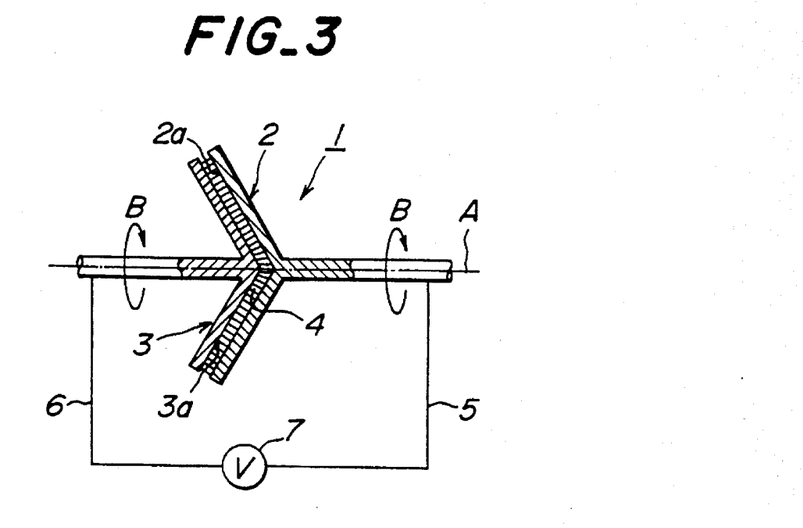
FIG. 3 is a cross-sectional view illustrating a third embodiment of the electrically controlled force transmitting apparatus according to the present invention.

FIG. 3 illustrate a third embodiment of the electrically controlled force transmitting apparatus according to the present invention. In this embodiment, an electrically controlled force transmitting apparatus 1 comprises a drive member 2 and driven member 3 of conical shape, and they are arranged in the same manner as in the first embodiment. When the opposed surfaces 2a and 3a have conical shape, a larger opposed area can be obtained as compared with that of the circular shape without increasing a radial size of the apparatus. A conical-shape fiber assembly is fixed to the surface 3a of the driven member 3 to constitute a fibrous member 4 between the drive member 2 and driven member 3. A voltage applying means 7 is connected across the opposed surfaces 2a and 3a via conductors 5 and 6.

Figure 4:
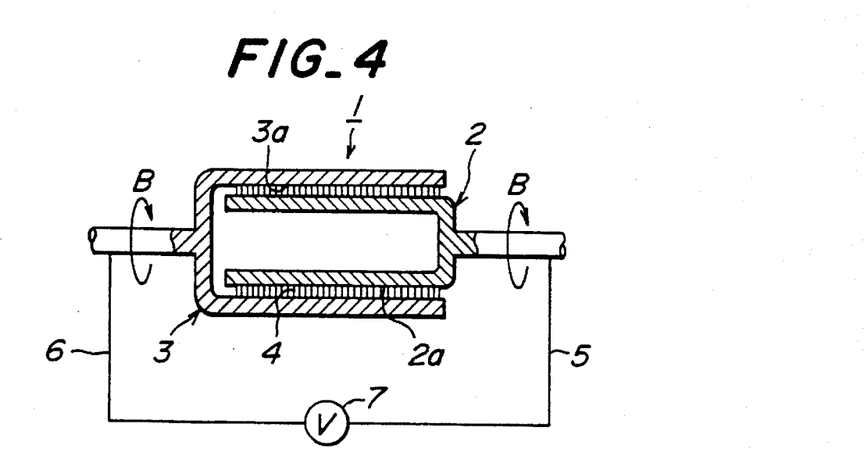
FIG. 4 is a cross-sectional view illustrating a fourth embodiment of the electrically controlled force transmitting apparatus according to the present invention.

Referring to FIG. 4, there is shown a fourth embodiment of the electrically controlled force transmitting apparatus according to the present invention. In this embodiment, an electrically controlled force transmitting apparatus 1 comprises a drive member 2 and driven member 3 of cylindrical shape, and they are also arranged in the same manner as in the first embodiment. Similar to the third embodiment, a larger opposed area can be obtained without increasing a radial size of the apparatus. In this case, a sleeve-like fiber assembly is provided between the opposed surfaces 2a and 3a without being fixed to either of them, thereby constituting a fibrous member 4. A voltage applying means 7 is also connected across the opposed surfaces 2a and 3a via conductors 5 and 6.

Figure 5:
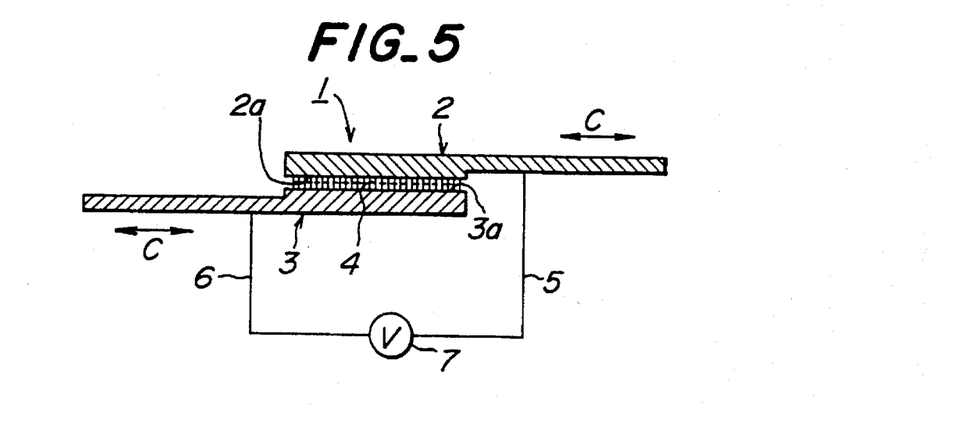
FIG. 5 is a cross-sectional view illustrating a fifth embodiment of the electrically controlled force transmitting apparatus according to the present invention.

Referring to FIG. 5, there is shown a fifth embodiment of the electrically controlled force transmitting apparatus according to the present invention. In this embodiment, an electrically controlled force transmitting apparatus 1 comprises a drive member 2 and driven member 3 including plate-like members which are arranged movably linearly as shown by double-headed arrow C in a reciprocal manner and surfaces 2a and 3a of these plate-like members are faced with each other at a predetermined distance to form a small space therebetween. In this embodiment, a fibrous member 4 comprises two fiber assemblies each being fixed to respective opposed surfaces 2a and 3a of the drive and driven members 2 and 3. A voltage applying means 7 is also connected across the opposed surfaces 2a and 3a via conductors 5 and 6.

As described above, in the embodiments so far explained with reference to FIGS. 1–5, the voltage applying means 7 is connected across the opposed surfaces 2a and 3a via conductors 5 and 6, and the opposed surfaces 2a and 3a have another function as electrodes. Therefore, the opposed surfaces 2a and 3a should be made of an electrically conductive material. That is, the drive member 2 and driven member 3, as a whole, are made of an electrically conductive material such as a metal. According to the invention, the drive member and driven member may be formed as a composite structure wherein only the opposed surfaces are made of an electrically conductive material.

According to the invention, it is preferable to keep the distance between the opposed surfaces 2a and 3a of the drive and driven members 2 and 3 constant. In this case, a strength of electric field can be controlled by simply adjusting the voltage applied by the voltage applying means 7.

In the electrically controlled force transmitting apparatus according to the invention, the fibrous member 4 provided between the opposed surfaces 2a and 3a of the drive and driven members 2 and 3 may be formed by any fiber or fiber assembly.

Fibers usable in the present invention may include, for example, cotton, wool, silk, hemp, viscose (rayon) fiber, cuprammonium fiber, acetate fiber, polypromix fiber, polyamide-based (nylon-based) fiber, polyvinyl alcohol-based (vinylon-based) fiber, polyvinyl chloride-based fiber, polyvinylidene chloride-based (saran-based) fiber, polyester-based (tetoron-based) fiber, polyacrylonitrile-based (Orlon-based) fiber, polyethylene-based fiber, polypropylene-based fiber, polyurethane-based (Perion-based) fiber, polyalkyleneparaoxybenzoate-based fiber, polychlal-base fiber, aromatic polyamide (alamide) fiber, all-aromatic polyester fiber, fluorine-based fiber, chitin fiber, alginate fiber, collagen fiber, glass fiber, carbon fiber, silicon carbide fiber, boron fiber, alumina fiber and the like.

Examples of the fiber assembly usable in the present invention may include tread, cord, woven fabric, knitted fabric, lace, non-woven fabric, leather, paper, felt and the like. Further, fabrics having been subjected to surface working are also applicable, and examples of such surface working may include flock working, embossing finish, crepe finish, crease working, mold stamping, plisse working and moire working and the like.

With respect to the relation between the surface state of the fibers or fiber assemblies and the induced shear stress, it has been observed that a fuzzier surface (a surface with more naps) generates larger shear stress. Accordingly, fibers and fiber assemblies having a very fuzzy surface (a surface with more naps) such as pile fabric (velvet, etc.) is preferably used in the present invention.

In the electrically controlled force transmitting apparatus 1 of the present invention, the fibrous member 4 may be provided between the opposed electrically conductive surfaces 2a and 3a without being fixed to either of them. The fibrous member 4 may also be constituted by fibers or a fiber assembly fixed to either of the opposed surfaces 2a and 3a, or fibers or fiber assemblies fixed to each of the opposed surfaces 2a and 3a. The fibers or fiber assembly can be fixed to the opposed surfaces by any known method. Generally, an adhesive is used for fixing fibers, and an appropriate adhesive is selected depending on the kind of material of the opposed surfaces 2a and 3a as well as on the kind of fiber used as the fibrous member 4. The fiber or fiber assembly may be fixed to the opposed surfaces 2a and 3a by contact bonding using an appropriate jig or by static flocking.

In the electrically controlled force transmitting apparatus 1 of the present invention, the space between the opposed surfaces 2a and 3a of the drive and driven members in which the fibrous member 4 is provided may contain nothing other than the fibrous member 4, or may be filled with an electrically insulating fluid medium such as a gaseous body or liquid. Any gaseous bodies may be used as the medium as long as they have a poor electrical conductivity.

Examples of such gaseous bodies may include air, nitrogen, oxygen, helium, neon, etc. Any liquids may be used as the medium as long as they have a poor electrical conductivity and the fibrous member is insoluble in it. As such liquids, mention may be made of mineral oils such as paraffin, naphthen, olefin; animal and plant oils; synthetic oils such as hydrocarbon, silicone oil, etc.

In the electrically controlled force transmitting apparatus according to the present invention, transmission of force from the drive member to the driven member can be electrically controlled by adjusting the voltage applied across the opposed electrically conductive surfaces. The mechanism of force transmission is as follows. In the case where the fibrous member is constituted by fibers or fiber assemblies fixed to each of the opposed surfaces, one fixed to the surface of the drive member is opposed to one fixed to the surface of the driven member such that they can come into loose contact with each other, or that they can come into contact with each other with an appropriate overlap when no voltage is applied across the opposed surfaces. Accordingly, upon the application of the voltage, the opposed fibers or fiber assemblies come into contact to be intertwined strongly with each other, thereby inducing shear stress by which torque of rotation, displacement of reciprocal motion or the like of the drive member is transmitted to the driven member. In this case, the shear stress is induced due to the electrostatic attraction force between the fibers fixed to each of the opposed surfaces of the drive and driven members.

In the case where the fibrous member is constituted by fibers or a fiber assembly fixed to either of the opposed surfaces of the drive and driven members, the shear stress is induced due to increase in friction between the fibers or fiber assembly secured on one surface and the other bare surface caused by the application of voltage, thereby enabling the fibrous member to transmit the force or motion from the drive member to the driven member.

In the case where the fibrous member is constituted by fibers or a fiber assembly provided between the opposed surfaces of the drive and driven member without being fixed to either of them, the shear stress is also induced upon the application of voltage due to increase in friction between the fibrous member and the opposed surfaces of the drive and driven members.

Example 1

Figure 6A:
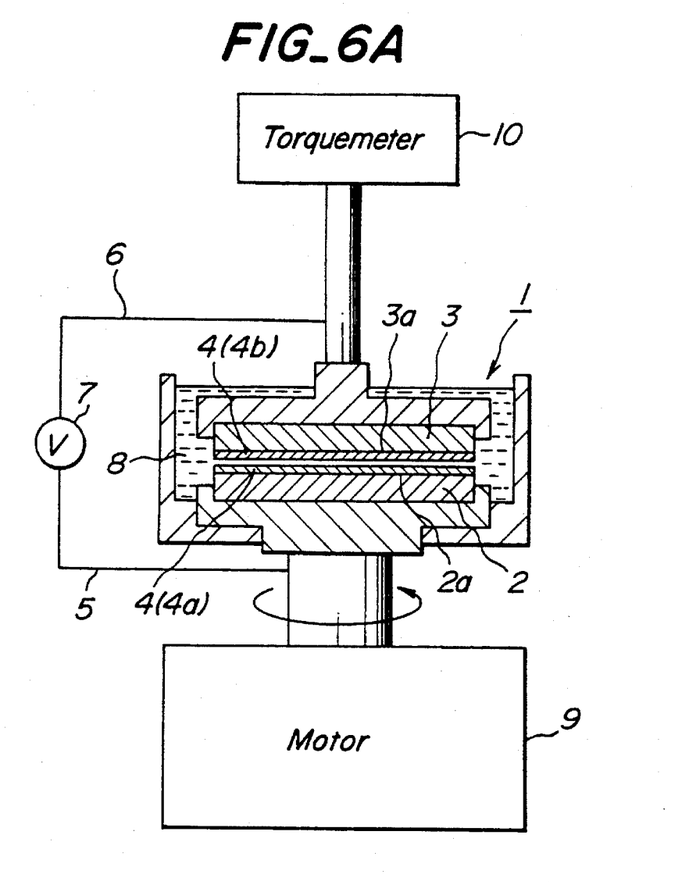
FIG. 6(A) is a partially cross-sectional view illustrating a torque detecting device used for evaluating the torque transmitting property of the electrically controlled force transmitting apparatus according to the present invention.
Figure 6B:
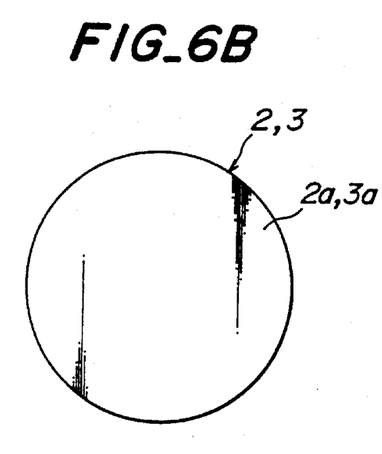
FIG. 6(B) is a plan view showing the electrode of the apparatus shown in FIG. 6(A)
Figure 6C:
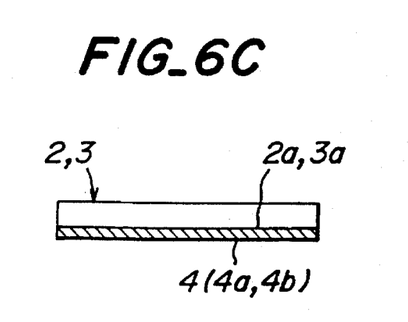
FIG. 6(C) is a side view showing the lateral side of the electrode shown in FIG. 6(B)

Referring to FIG. 6(A), there is shown a torque detecting device equipped with the electrically controlled force transmitting apparatus 1 of the first embodiment of the present invention. In this apparatus 1, a pair of circular plates made of stainless steel (diameter: 5 cm) as shown in FIG. 6(B) are used as drive member 2 and driven member 3 and are arranged in parallel with each other, while a small space is formed therebetween to have their respective surfaces 2a and 3a opposed to each other. Incidentally, the circular plates constituting the drive member 2 and driven member 3 also perform a function as electrodes. A cotton velvet (thickness: 1.1 mm, surface nap density: 60,000/$cm^2$, nap diameter: about 20 μm) is used as fiber assemblies 4a and 4b, which are respectively fixed to the opposed surfaces 2a and 3a by using adhesive of epoxy resin, thereby constituting a fibrous member 4 as shown in FIG. 6(C). The drive member 2 and driven member 3, i.e. the electrodes 2 and 3 are connected to an adjustable DC voltage supply source 7 via conductors 5 and 6 in such a manner that the naps on the opposed surfaces 2a and 3a are raised toward each other. In this connection, the distance between electrodes is 2.2 mm and the space around the fibrous member 4 is filled with a medium 8 of electrically insulating silicone oil (TSF451-10, manufactured by Toshiba Silicone Company). The electrode composed of the drive member 2 is then connected to a motor 9, and the other electrode composed of the driven member 3 is connected to a torque meter 10. With this construction, there was conducted a measurement of torque which was transmitted from the drive member 2 to the driven member 3 in order to determine a shear stress in relation to the number of revolution per minute.

Figure 7:
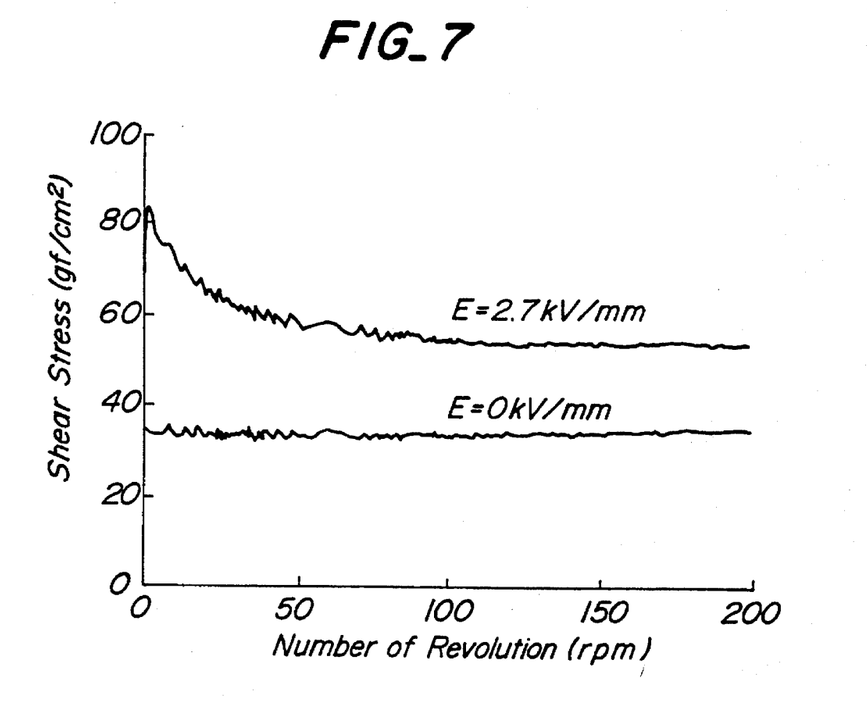
FIG. 7 is a graph showing the relationship between revolution number and shear stress in Example 1.

The relationship between the shear stress and the number of revolution per minute is shown in FIG. 7. As is clear from FIG. 7, there is considerable difference in amounts between the shear stress in the case where a voltage corresponding to the electric field strength (E) of 2.7 kV/mm was applied and the shear stress in the case where no voltage is applied. Specifically, it is confirmed that more than 50 gf/$cm^2$ of shear stress was induced in a range where the number of revolution per minute is small, and about 20 gf/$cm^2$ of shear stress was generated even in a range where the number of revolution per minute is rather large. Incidentally, a current flowing between the opposed surfaces upon the application of voltage was very small such that a current density of about 5 μA/$cm^2$ was observed.

Example 2

Figure 8:
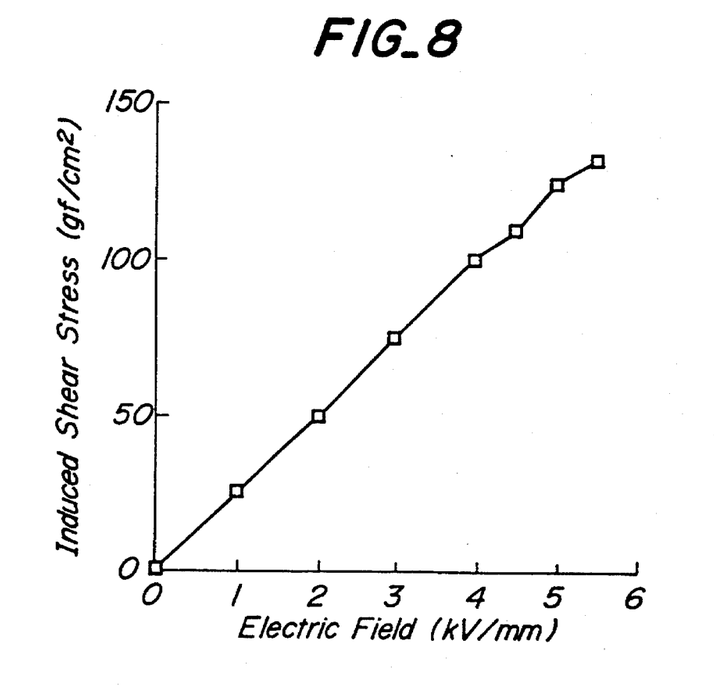
FIG. 8 is a graph showing the relationship between applied voltage and induced shear stress in Example 2.

The shear stress in relation to the number of revolution per minute was measured in the same manner as in Example 1 except that the revolving speed was kept at 1 rpm and the distance between the electrodes was set to 2 mm. The result is shown in FIG. 8. As is clear in FIG. 8, the induced shear stress is linearly increased in accordance with an increase in the applied voltage, and an induced shear stress as large as 130 gf/$cm^2$ was measured when the voltage was applied such that an electric field strength of 5.5 kV/mm was produced between the opposed surfaces. From this result, it is confirmed that the induced shear stress can be controlled by adjusting the voltage applied by the DC voltage supply source 7 across the opposed surfaces.

Example 3

Measurements similar to that in Example 1 were conducted while using, as the fibrous member 4, eleven different cloths with plain weave shown in Table 1, which were made of various fiber materials. The thickness of cloth, distance between electrodes, applied voltage, current density and electric field strength were varied among the samples as shown in Table 1. In Table 1, there are also shown the results of the measurements, namely largest (maximum) induced shear stress and shear stress at a time when no voltage applied.

TABLE 1

| Sample No. | Kind of Fiber | Name | Cloth Thickness (mm) | Distance between Electrodes (mm) | Applied Voltage (kV) | Current Density ($\mu A/cm^2$) | Electric Field (kV/mm) | Maximum Induced Shear Stress ($gf/cm^2$) | Shear Stress at 0 V ($gf/cm^2$) |
|---|---|---|---|---|---|---|---|---|---|
| 1 | cotton | broadcloth | 0.26 | 0.7 | 3 | 1.3 | 4.3 | 5.0 | 3.5 |
| 2 | cotton | Kanakin #3 | 0.25 | 0.7 | 3 | 3.9 | 4.3 | 7.5 | 3.0 |
| 3 | wool | muslin | 0.32 | 0.7 | 3 | <1.0 | 4.3 | 0.4 | 3.0 |
| 4 | hemp | broadcloth | 0.29 | 0.7 | 3 | 3.2 | 4.3 | 5.5 | 3.0 |
| 5 | rayon | taffeta | 0.14 | 1.0 | 5 | 1.3 | 5.0 | 2.0 | 0.2 |
| 6 | polynosic | poplin | 0.21 | 0.7 | 3 | 1.3 | 4.3 | 6.0 | 1.7 |
| 7 | cupra | poplin | 0.23 | 0.5 | 2 | 3.9 | 4.0 | 4.0 | 3.0 |
| 8 | acrylic fiber | Vonnel | 0.27 | 0.7 | 3 | <1.0 | 4.3 | 1.2 | 1.2 |
| 9 | acrylic fiber type | Kanekalon/ poplin | 0.42 | 1.0 | 4 | <1.0 | 4.0 | 1.0 | 1.0 |
| 10 | polychlal | Cordelan | 0.30 | 0.5 | 2 | 1.0 | 4.0 | 0.5 | 1.5 |
| 11 | glass fiber | glass fiber | 0.19 | 0.7 | 6 | 1.3 | 8.6 | 1.2 | 1.0 |

As is clear from the results shown in Table 1, a large shear stress was induced when cloths of natural as well as synthetic cellulose fibers were used as the fibrous member.

Example 4

Measurements similar to that in Example 1 were again conducted with respect to a fibrous member 4 of cotton velvet (thickness: 1.1 mm, surface nap density: about 40,000/cm$^2$), while using various mediums 8 shown in Table 2, in order to investigate the influence or function of the medium upon the induced shear stress. The distance between electrodes, applied voltage, current density and electric field strength were set at such values as shown in Table 2. The results are also shown in Table 2.

TABLE 2

| Medium | Distance between Electrodes (mm) | Applied Voltage (kV) | Current Density ($\mu A/cm^2$) | Electric Field (kV/mm) | Induced Shear Stress ($gf/cm^2$) |
|---|---|---|---|---|---|
| air | 2.2 | 4 | 0.7 | 1.8 | 2 |
| mineral oil | 2.0 | 10 | 2.6 | 5 | 10 |
| silicone oil (10 cP) | 2.0 | 10 | 5.0 | 5 | 70 |
| silicone oil (50 cP) | 2.0 | 10 | 4.0 | 5 | 53 |

As is clear from the results shown in Table 1, a significantly large induced shear stress can be obtained when silicone oil is used as the fluid medium 8.

Example 5

Figure 9:
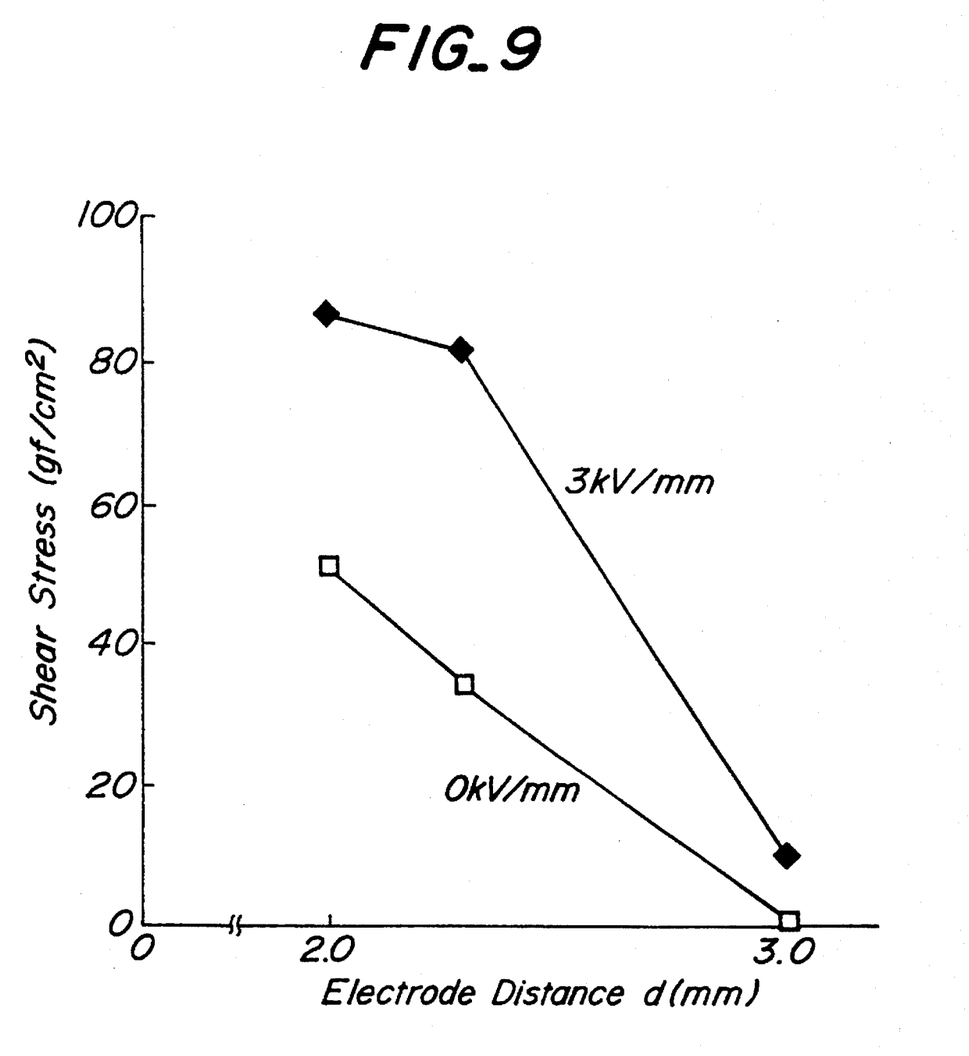
FIG. 9 is a graph showing the relationship between shear stress and distance between electrodes in Example 5.

Measurements of shear stress similar to that in Example 1 were conducted with respect to a fibrous member 4 of rayon velvet (thickness: 1.45 mm, surface nap density: about 10,000/cm$^2$, nap diameter: about 20 μm), while varying the distance between electrodes. The results are shown in FIG. 9. As is clear from the graph in FIG. 9, the induced shear stress can be controlled by adjusting the distance between electrodes substantially in a linear manner.

Example 6

Measurements of shear stress were conducted in the same manner as in Example 1 except that the fibrous member 4 was constituted by cotton velvet (thickness: 1.1 mm, surface nap density: about 40,000/cm$^2$) fixed to one of the electrode plates which functions as a negative polarity electrode (ground side electrode) by using epoxy resin adhesive and that the distance between the electrodes was set to 1 mm. The shear stress at the time when no electric field was applied was 8 gf/cm$^2$, and that at the time when the electric field of 5 kV/mm was applied was 30 gf/cm$^2$.

Substantially the same results were obtained when the fibrous member 4 was constituted by the same kind of cloth which was fixed to one of the electrode plates functioning as a positive polarity electrode.

Example 7

The torque detecting device shown in FIG. 6(A) is equipped with an electrically controlled force transmitting apparatus 1, which has substantially the same constitution as that of the first embodiment except for the distance between electrodes and the constitution of the fibrous member 4. More specifically, in this embodiment, the distance between electrodes is set to 1.5 mm, and a cotton velvet (thickness: 1.5 mm, surface nap density: 40,000/cm$^2$, nap diameter: about 20 μm) formed into a circular shape having a diameter of 5 cm is interposed between the drive member 2 and driven member 3 without being fixed to either of them in such a manner that the naps of the cloth are raised or erected toward the positive polarity electrode (anode) to constitute the fibrous member 4. With this construction, the drive member 2 was rotated at 1 rpm, and the torque transmitted from the drive member 2 to the driven member 3 was measured to determine the shear stress.

The shear stress at the time when no voltage was applied was 6 gf/cm$^2$, and that at the time when voltage of 4.3 kV was applied was 60 gf/cm$^2$. Incidentally, the current density upon the application of voltage was very small such as about 6 μA/cm$^2$.

Example 8

The torque detecting device shown in FIG. 6(A) is equipped with an electrically controlled force transmitting apparatus 1 having substantially the same construction as that of the fourth embodiment shown in FIG. 4 except for the constitution of the fibrous member 4, which is constituted by fiber assemblies respectively fixed to the opposed surfaces 2a and 3a. In the apparatus 1 of this embodiment, the drive member 2 and driven member 3 are constructed as telescopic cylinders which also perform the function as electrodes, and the inner cylinder constituting the drive member 2 (outer diameter: 20 mm) is concentrically arranged within the outer cylinder constituting the driven member 3 (inner diameter: 22 mm, axial length: 60 mm) to provide opposed surfaces 2a and 3a with a sleeve-like space therebetween. More specifically, the surface 2a is formed by the outer surface of the drive member 2 and the surface 3a is formed by the inner surface of the driven member 3, and the distance between them, i.e. the distance between electrodes, is set to 1 mm. A cotton cloth with plain weave is fixed to each of the opposed surfaces 2a and 3a by using adhesive of epoxy resin, in such a manner that the cotton cloth come into contact with each other, thereby constituting the fibrous member 4. With this construction, there was conducted a measurement of torque which was transmitted from the drive member 2 to the driven member 3 to determine shear stress with respect to a shear rate.

As a result, it was confirmed that a shear stress of about 10 gf/cm$^2$ was induced upon application of the electric filed of 6 kV/mm when the shear rate was 24 sec$^{-1}$. Incidentally, a very small current density of 5 μA/cm$^2$ was measured.

Further, the drive member 2 was continuously rotated for two hours at a shear rate of 360 sec$^{-1}$, while being applied with voltage of 2 kV. During this operation, the induced shear stress was not changed. Moreover, no fiber has got mixed in the medium 8 of silicone oil after the operation.

Example 9

Figure 10:
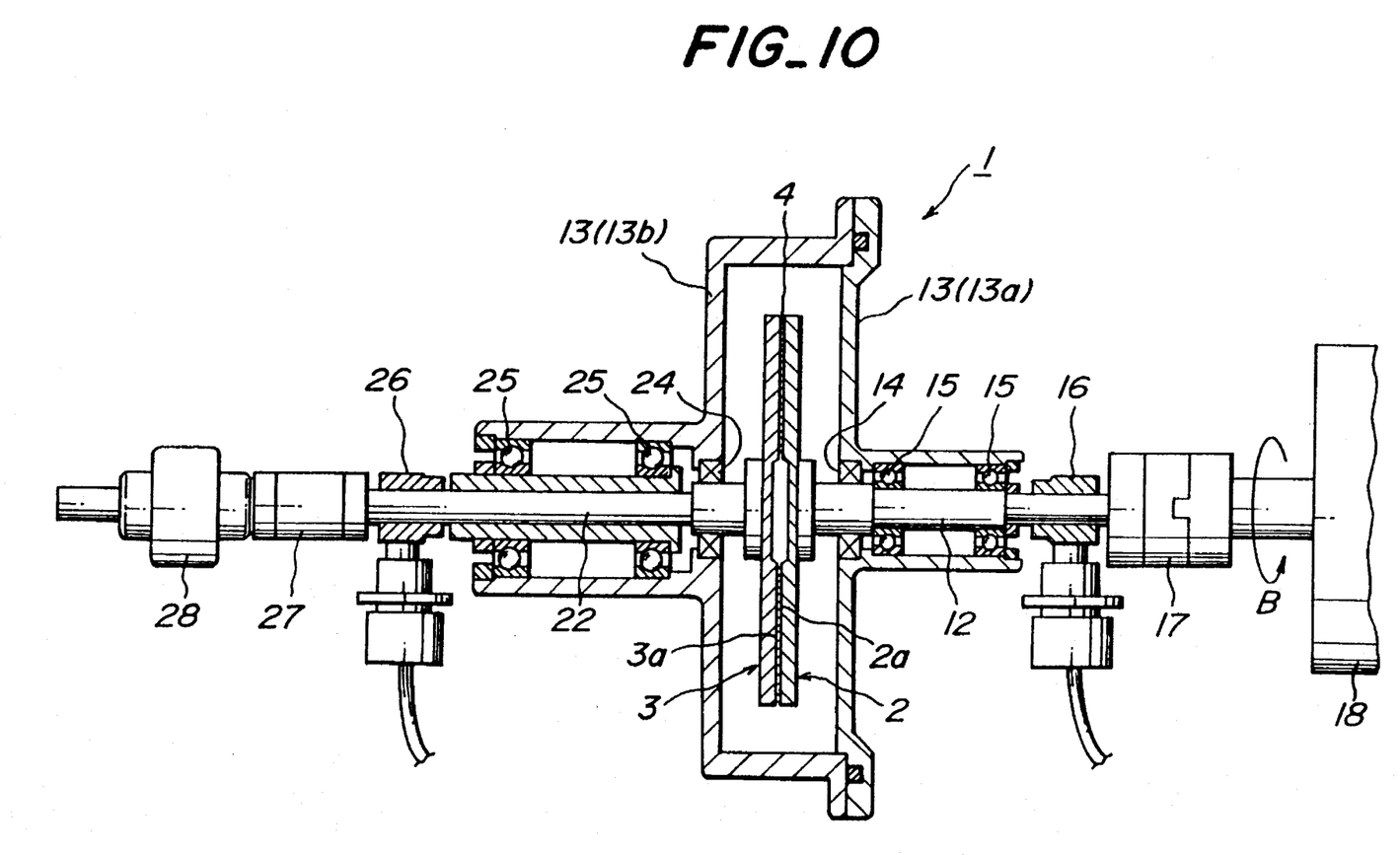
FIG. 10 is a partially cross-sectional view illustrating a prototype clutch using the force transmitting apparatus of Example 9.

A viscous shear clutch as shown in FIG. 10, which comprises a pair of opposed circular plates (diameter: 120 mm) functioning as electrodes, was manufactured as a prototype of the electrically controlled force transmitting apparatus 1 according to the present invention. In this viscous shear clutch, one of the plate electrodes constitutes a drive member 2. A drive shaft 12 is secured to a first casing half 13a of a casing 13 via insulating bearings 15, and an O-ring 14 is provided between the drive shaft 12 and the first casing half 13a. Further, the drive shaft 12 is connected to the non-ground side of a DC voltage supply source through a connecting member 16, and also to a motor 18 via an insulating joint 17.

The other plate electrode constitutes a driven member 3. A driven shaft 22 is secured to a second casing half 13b via insulating bearings 25, and an O-ring 24 is provided between the driven shaft 22 and the second casing half 13b. Further, the driven shaft 22 is connected to the ground side of the DC voltage supply source through a connecting member 26, and also to a torque meter 28 via an insulating joint 27.

Annular shaped cotton velvet and plain-weave cotton plates (outer diameter: 60 mm, inner diameter 15 mm) are fixed to each of the opposed surfaces 2a and 3a of the drive and driven member 2 and 3 with epoxy resin adhesive, thereby constituting a fibrous member 4. The electrodes, i.e. the drive and driven members 2 and 3 are arranged to be separated from each other by a distance of 1 mm, in such a manner that the cloths secured to the opposed surfaces are in contact with each other. The casing 13 is then charged with a medium 8 of silicone oil (TSF451-10 manufactured by Toshiba Silicone Company). With this construction, the drive member 2 was rotated by means of the motor 18 at a rate of 4.5 rpm in the direction shown by an arrow B, and a DC voltage of 4 kV was applied between the drive member 2 and driven member 3 in order to evaluate a force transmission property.

Under the above-mentioned conditions, torque of about 0.05 kgf.m was generated in the driven member 3, and thus it has been confirmed that the force transmitting apparatus according to the present invention can be controlled by adjusting the applied voltage.

Further, it was observed whether the amount of transmitted torque varies or not as time passes by temporarily switching off the voltage of 4 kV at every 15 seconds. The value of the transmitted torque was not changed even after the repetition of 5,000 times, and thus it has been confirmed that the force transmitting apparatus according to the present invention has excellent force transmitting property.

Comparative Example 1

Example 8 was repeated, while using an electro-viscous fluid instead of a fibrous member in a medium. Specifically, there was used an electro-viscous fluid obtained by dispersing Zeolite 4A (manufactured by Sigma Company, average particle size: 5.7 μm), which had been dried at 400° C. for five hours, in silicone oil (TSF451-10 manufactured by Toshiba Silicone Company) to form a dispersion containing 34 wt % of dispersed particles. Incidentally, the measurement of shear stress was conducted under the following conditions: shear rate: 360 sec$^{-1}$, electric field: 5 kV/mm. As a result, it was confirmed that a small induced shear stress of 6.5 gf/cm$^2$ was generated upon application of the electric filed, and a large current density such as 59 μA/cm$^2$ was observed.

Furthermore, when this device was left untouched for a couple of days, there happened sedimentation and solidification of Zeolite particles in the electro-viscous fluid, and the aggregated particles could hardly be re-dispersed.

Comparative Example 2

Example 8 was again repeated using an electro-viscous fluid instead of the fibrous member and medium. In this case, use was made of an electro-viscous fluid obtained by dispersing silica (manufactured by Mizusawa Chemical Company, average particle size: 2.9 μm) in silicone oil (TSF451-10 manufactured by Toshiba Silicone Company) to form a dispersion containing 29 wt % of dispersed particles. Incidentally, the measurement of shear stress was conducted under the following conditions: shear rate: 360 sec$^{-1}$, electric field: 4 kV/mm. As a result, it was confirmed that only a very small shear stress of 4 gf/cm$^2$ was induced upon the application of the electric field, and an observed current density was very large such as 160 μA/cm$^2$.

As described above, in the electrically controlled force transmitting method and apparatus according to the present invention, a large shear stress can be induced upon the application of voltage, while being accompanied with a low current density. Accordingly, the force transmission property can be controlled solely by adjusting the applied voltage in the present invention. Furthermore, different from the known electro-viscous fluids, no particles are used in the present method and apparatus. Consequently, the electrically controlled force transmitting method and apparatus according to the present invention are free from the aggregation and sedimentation of particles in a dispersion as well as the wear of apparatus components caused by the particles.

While the invention has been described with reference to specific embodiments, this was for purposes of illustration only and should not be construed to limit the scope of the invention.

What is claimed is:

1. A method of transmitting force from a drive member to a driven member in an electrically controllable manner comprising the steps of:

arranging a drive member having an electrically conductive surface and a driven member having an electrically conductive surface such that said electrically conductive surfaces of the drive and driven members are opposed to each other with a small space;

providing a fibrous member in said space formed between said opposed electrically conductive surfaces of the drive and driven members; and adjusting a voltage applied across said opposed electrically conductive surfaces of the drive and driven members.

2. An apparatus for transmitting a force in an electrically controllable manner comprising:

a drive member having an electrically conductive surface;

a driven member having an electrically conductive surface which is arranged to be opposed to said electrically conductive surface of the drive member, while a space is formed between the opposed electrically conductive surfaces of the drive and driven members;

a fibrous member provided within said space between the opposed electrically conductive surfaces of the drive and driven members; and a voltage applying means connected across the opposed electrically conductive surfaces of the drive and driven members; whereby transmission of force from the drive member to the driven member is electrically controlled by adjusting a voltage applied across the opposed electrically conductive surfaces of the drive and driven members.

3. The apparatus according to claim 2, wherein said space between said opposed electrically conductive surfaces of said drive and driven members is filled with an electrically insulating fluid medium.

4. The apparatus according to claim 3, wherein said medium is an electrically insulating liquid.

5. The apparatus according to claim 4, wherein said electrically insulating liquid is formed by a liquid selected from the group consisting of paraffin, naphthen, olefin, animal oil, plant oil, hydrocarbon oil and silicone oil.

6. The apparatus according to claim 3, wherein said fluid medium is an electrically insulating gaseous body.

7. The apparatus according to claim 6, wherein said electrically insulating gaseous body is formed by a material selected from the group consisting of air, nitrogen, oxygen, helium, and neon.

8. The apparatus according to claim 2, wherein said fibrous member comprises a first fiber assembly fixed to said electrically conductive surface of said drive member and a second fiber assembly fixed to said electrically conductive surface of said driven members.

9. The apparatus according to claim 2, wherein said fibrous member is constituted by a fiber assembly fixed to either one of said opposed electrically conductive surfaces of said drive and driven members.

10. The apparatus according to claim 2, wherein said fibrous member is constituted by a fiber assembly provided in said space without being fixed to either of said opposed electrically conductive surfaces of said drive and driven members.

11. The apparatus according to claim 2, wherein said drive and driven member are arranged to be rotatable relative to each other.

12. The apparatus according to claim 11, wherein said opposed surfaces of said drive and driven members are of circular shape.

13. The apparatus according to claim 11, wherein said opposed surfaces of said drive and driven members are of cylindrical shape.

14. The apparatus according to claim 11, wherein said opposed surfaces of said drive and driven members are of conical shape.

15. The apparatus according to claim 2, wherein said drive and driven members are arranged to be movable reciprocally.

16. The apparatus according to claim 2, wherein said fibrous member is constituted by at least one kind of fiber selected from the group consisting of natural fibers and synthetic fibers.

17. The apparatus according to claim 16, wherein said group includes cotton, wool, silk, hemp, viscose (rayon) fiber, cuprammonium fiber, acetate fiber, polypromix fiber, polyamide-based (nylon-based) fiber, polyvinyl alcohol-based (vinylon-based) fiber, polyvinyl chloride-based fiber, polyvinylidene chloride-based (saran-based) fiber, polyester-based (tetoron-based) fiber, polyacrylonitrile-based (Orlon-based) fiber, polyethylene-based fiber, polypropylene-based fiber, polyurethane-based (Perion-based) fiber, polyalkyleneparaoxybenzoate-based fiber, polychlal-base fiber, aromatic polyamide (alamide) fiber, all-aromatic polyester fiber, fluorine-based fiber, chitin fiber, alginate fiber, collagen fiber, glass fiber, carbon fiber, silicon carbide fiber, boron fiber, and alumina fiber.

18. The apparatus according to claim 2, wherein said fibrous member is made of a material selected from the group consisting of thread, woven fabric, knitted fabric, non-woven fabric, felt, flock fabric, leather, paper and their combination.

19. The apparatus according to claim 2, wherein said fibrous member is formed by fibers or fiber assemblies having a fuzzy surface including many naps.

20. The apparatus according to claim 19, wherein said fibrous member is formed by pile fabrics.

* * * * *